March 25, 1941.      F. M. CLARK      2,236,261
DIELECTRIC AND COOLING COMPOSITION
Filed Oct. 23, 1937
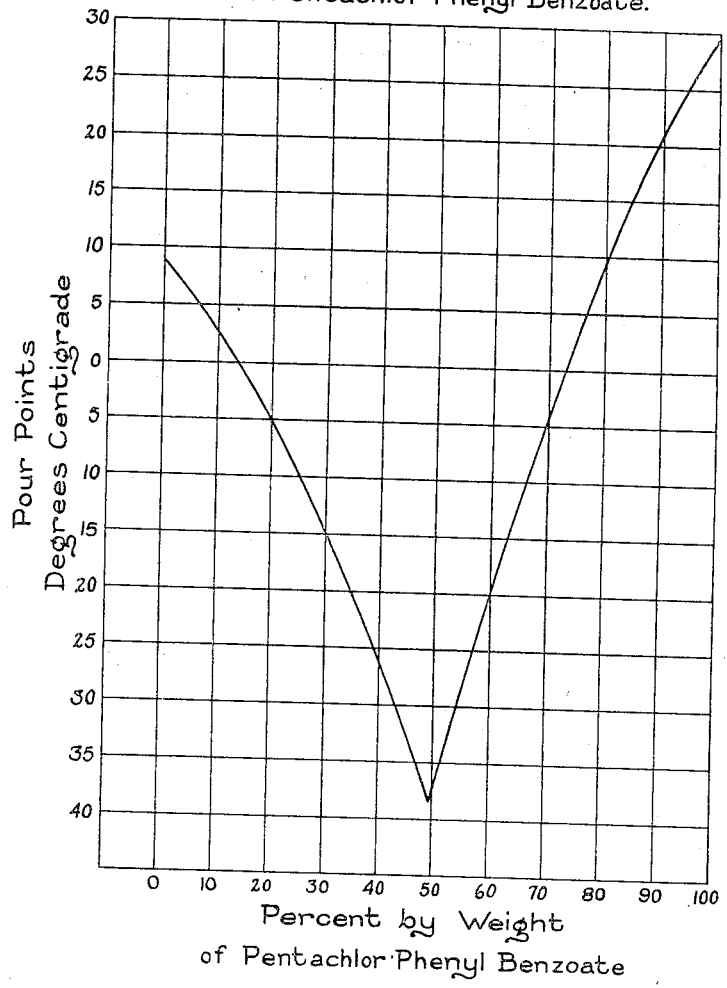
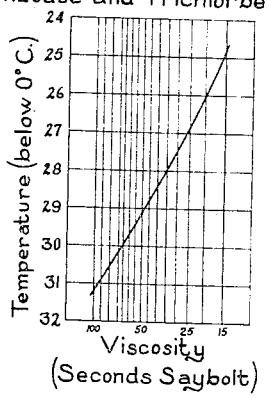
Inventor:
Frank M. Clark,
by Harry E. Dunham
His Attorney.

Patented Mar. 25, 1941

2,236,261

UNITED STATES PATENT OFFICE 2,236,261

DIELECTRIC AND COOLING COMPOSITION

Frank M. Clark, Pittsfield, Mass., assignor to General Electric Company, a corporation of New York Application October 23, 1937, Serial No. 170,713

16 Claims. (Cl. 252—65)

The present invention relates to liquid compositions which are suitable for heat transfer and dielectric purposes and comprise new compositions in which halogenated organic ester compound is an ingredient.

When liquids are employed for heat transfer and electric insulating purposes under outdoor conditions as, for example, in electric transformers which may be idle in the open for days or weeks, then it is highly desirable that such liquids should be capable of resisting long-continued cold winter weather without deterioration. Some liquids, which are entirely satisfactory for use in such apparatus at summer temperatures and remain liquid when the exposure to extreme cold is short, have their use subjected to the handicap that long-continued cold in winter results in crystal formation or even complete solidification.

In accordance with my present invention I have provided new and improved liquid compositions comprising halogenated esters of benzoic acid, and preferably chlorinated phenyl benzoate. In such esters the halogens are divided between the two carbon rings. Mixtures of such compositions and a suitable halogenated hydrocarbon, for example, chlorinated benzene, will remain liquid at extremely low temperatures without partial crystal formation even when the low temperature conditions continue for as long periods as are ever encountered under climatic conditions.

In the accompanying drawing, Fig. 1 is a graph indicating pour points of different mixtures, and Fig. 2 is a graph indicating the viscosity of various compositions.

It has been found that the pour point value of such mixtures has little, if any, relation to the ability of the liquid to maintain its liquidity when exposed to long-continued cold. For example, a composition A consisting by weight of a mixture of 60 parts hexachlor diphenyl and 40 parts trichlorbenzene (as mixture of isomers) has a pour point of —32° C. as determined by a standard test of the American Society for Testing Materials (A. S. T. M.). However, such compositions become solidified when subjected to temperatures as low as —20° C. for periods as long as from five to ten days.

When pentachlor phenyl benzoate was substituted wholly for the chlor diphenyl component forming a new composition B, the pour point of this composition as shown in Fig. 1, is found to be higher, namely, about —20° C. The pour point alone does not indicate superiority of B over the chlor diphenyl mixture A in electrical apparatus subjected to low temperatures, and indeed, appears to indicate the contrary. However, when exposed to continued low temperature in the range below —20° C., an entirely unexpected and advantageous property of the new pentachlor phenyl benzoate composition B is encountered. Even when exposed to continued low temperature, as low as —31° C., the new composition B remains liquid and fully capable of serving as an efficient dielectric and cooling medium.

In Fig. 2 is indicated the viscosity (plotted as abscissae) of such mixture B over a low temperature range, below 0° C. (plotted as ordinates) each value indicated being obtained after an exposure time varying from six to fourteen days at the temperature given. In order to reduce the size of the graph, the viscosity values are plotted on semi-logarithmic coordinates, the actual values viscosity being a thousandfold greater than appears.

Low temperature liquidity is characteristic of mixtures of pentachlor phenyl benzoate and trichlorbenzene in varying proportions, both ingredients being used as liquid mixtures of isomers. As the amount of chlorinated phenyl benzoate added to trichlorbenzene increases up to about 50 per cent, as indicated by Fig. 1, the pour point falls. Mixtures containing approximately equal parts of both of said ingredients have pour points below —35° C., the graph showing a pour point of —38° C. As indicated, larger proportions of the chlorinated benzoate result in a rise of pour point. Pentachlor phenyl benzoate, unassociated with a diluent or modifier, is a liquid having a flow point of about 28° C.

It is not necessary that all of the chlorinated diphenyl in the typical composition chosen for illustration should be replaced by chlorinated phenyl benzoate. When the amount of chlorinated phenyl benzoate is equal to or exceeds 15 per cent by weight of the total mixture, continued liquidity at temperatures as low as —31° C. results. Thus, a mixture consisting of 15 per cent pentachlor phenyl benzoate, 40 per cent trichlorbenzene and 45 per cent of hexachlor diphenyl does not solidify down to —31° C. While some advantage may be obtained using lesser amounts of the chlor phenyl benzoate constituent, at least 15 per cent by weight is preferred. The viscosity characteristics of the latter mixture (i. e. 15% chlorinated phenyl benzoate) closely approximate the composition already described comprising 60 parts of chlor phenyl benzoate and 40 parts of the trichlorbenzene. The viscosity of the latter composition at −25° C. is about 16,000 seconds, whereas the former (15 per cent chlor phenyl benzoate) composition is about 18,000 seconds at the same temperature, each having been exposed for six days before test.

Compositions containing by weight about 15 to 45 parts of pentachlor phenyl benzoate, about 40 parts of trichlorbenzene, and 45 to 15 parts of chlorinated diphenyl (60 per cent chlorine) have been found to have excellent low temperature characteristics.

In place of trichlorbenzene, other low viscosity diluents may be used, such diluents if non-inflammability is desired should be halogenated as well understood. For example, in place of trichlorbenzene, equivalent diluents may be used, such as chlorinated benzotrifluoride and chlorinated ethyl benzene, both being liquid chlorinated derivatives of benzene.

As liquid chlorinated phenyl benzoate has a materially higher viscosity than the chlorinated diphenyl (i. e. the commercial isomeric product) it is surprising that the addition of such chlorinated ester to trichlorbenzene, while raising the pour point to higher temperatures than obtained with the chlor diphenyl-trichlorbenzene mixture of similar trichlorbenzene content, should in contrast endow the new composition with permanent liquidity at temperatures as low as about −30° C. It is not understood why liquid mixtures having approximately the same pour point, one mixture containing chlorinated phenyl benzoate, while the other does not (the other ingredients being trichlorbenzene and penta- or hexachlor diphenyl) should differ so radically in their property of resisting solidification at low temperature with time.

Many of the advantages of my present invention may be obtained by employing a benzoate other than the phenyl benzoate in a halogenated state for use in liquid heat-transfer and insulating materials. For example, chlorinated naphthyl, or methyl, ethyl, propyl and butyl benzoates may be so employed, replacing wholly or in part chlorinated phenyl benzoate in the above examples. With the chlorinated aliphatic esters of benzoic acid, it is essential that the chlorine should be entirely contained in the phenyl nucleus in order to obtain the desired chemical stability.

The ester phenyl benzoate is obtainable commercially and can be prepared in a variety of ways. One method is to carry out a reaction between phenol and benzoyl chloride at a temperature of about 150 to 170° C. The phenyl benzoate can be halogenated by bringing it in contact with chlorine, or other desired halogen, in the presence of a catalyzer or carrier such as iron, antimony or their chlorides. The chlorinating temperature preferably should be from 150 to 225° C. In general, the chlorinating temperature should increase progressively as the chlorination reaction proceeds. The chlorination may be carried out in apparatus similar to the apparatus used for making chlorinated diphenyl as described, for example, in Jenkins Patent No. 1,892,397, patented December 27, 1932, for a "Process for the production of chlorinated diaryls."

Although I have illustrated my invention with particular reference to the pentachlor phenyl benzoate, the tetrachlor and trichlor compounds, which are also liquid at ordinary temperatures and have pour points respectively of 15° and 10° C., may likewise be used although somewhat less advantageously than the pentachlor compound for admixture with other halogenated aryl compounds in accordance with my invention.

In a copending application, Serial No. 170,714, filed October 23, 1937, claims have been made on electric devices, and in particular capacitors, containing dielectric and insulating material comprising halogenated benzoate ester, and in particular pentachlor phenyl benzoate. When phenyl benzoate is halogenated by a method such as above-described, a halophenylbenzoate results in which the halogen atoms are attached to and divided among both carbon rings. For example, pentachlor (phenylbenzoate) produced by the described method and apparatus inherently has a chlorine content attached to and divided among both carbon rings and corresponding to an average of 3½ atoms of chlorine per molecule in the phenyl group and 1½ atoms of chlorine in the benzoyl group.

What I claim as new and desire to secure by Letters Patent of the United States is:

1. A liquid halogenated composition containing liquid benzoate ester and chlorinated benzene the proportion of each of said ingredients being sufficiently great to cause said composition to have a materially lower crystallizing temperature than the constituents thereof.

2. A liquid composition containing liquid chlorinated phenyl benzoate and chlorinated benzene the proportion of each of said ingredients being sufficiently great to cause said composition to have a materially lower crystallizing temperature than its constituents.

3. A liquid composition consisting of substantially equal parts of liquid chlorinated benzoate ester and trichlorbenzene, said composition having the property of remaining liquid at temperatures as low as −30° C.

4. A liquid cooling and insulating composition consisting of substantially equal parts of liquid chlorinated phenyl benzoate and trichlorbenzene, said composition having the property of remaining liquid at temperatures as low as −30° C.

5. A cooling and insulating composition comprising as essential ingredients liquid pentachlor phenyl benzoate and liquid isomeric trichlorbenzene, the proportion of each of said ingredients being sufficiently great to cause said composition to have a materially lower crystallizing temperature and pour point than its constituents.

6. A liquid cooling and insulating composition containing as an essential ingredient chlorinated benzoate ester in which all the chlorine atoms are chemically attached to and divided among the aromatic (aryl) carbon rings and chlorinated benzene, the proportion of each of said ingredients being sufficiently great to cause said composition to have a materially lower pour point than its constituents.

7. A cooling and insulating composition comprising as substantial ingredients liquid pentachlor phenyl benzoate, trichlorbenzene and chlorinated diphenyl, the proportion of each of said ingredients being sufficiently great to cause said composition to have a materially lower crystallizing temperature than its constituents.

8. A cooling and insulating composition the essential ingredients of which consist of liquid pentachlor phenyl benzoate, trichlorbenzene and chlorinated diphenyl containing 60% chlorine, the proportion of each of said ingredients being sufficiently great to cause said composition to have a materially lower crystallizing temperature than its constituents.

9. A cooling and insulating composition comprising by weight about 30 to 45 parts of liquid pentachlor phenyl benzoate, about 40 parts of trichlorbenzene and 30 to 15 parts of chlorinated diphenyl.

10. A liquid cooling and insulating composition for use in electric devices consisting by weight of about 15 to 45 parts of liquid pentachlor phenyl benzoate, about 40 parts of trichlorbenzene, and about 40 to 15 parts of chlorinated diphenyl of 60 per cent chlorine content.

11. A liquid composition comprising as an essential and substantial ingredient liquid pentachlor phenyl benzoate, said benzoate having a pour point of about 28° C.

12. A pentachlor (phenylbenzoate) which is liquid at ordinary temperatures.

13. As a new composition of matter, noncrystalline pentahalophenylbenzoate having halogen atoms attached to and divided among both carbon rings, and which is liquid at ordinary temperatures.

14. As a new composition of matter, liquid chlorphenylbenzoate having an average chlorine content corresponding to five chlorine atoms per molecule attached to and divided among both carbon rings.

15. As a new composition of matter viscous pentachlorphenylbenzoate having a chlorine content corresponding to an average of substantially 3½ atoms of chlorine per molecule in the phenyl group and 1½ atoms of chlorine in the benzoyl group.

16. As a new composition of matter, pentachlorphenylbenzoate having chlorine atoms attached to and divided among both carbon rings which will remain non-crystalline at room temperature indefinitely.

FRANK M. CLARK.

CERTIFICATE OF CORRECTION.

Patent No. 2,236,261.  March 25, 1941.

FRANK M. CLARK.

It is hereby certified that error appears in the printed specification of the above numbered patent requiring correction as follows: Page 2, second column, line 24, claim 1, strike out the word "halogenated" and insert the same after "liquid" in line 25, same claim; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.